United States Patent [19]
Crawley

[11] 3,784,329
[45] Jan. 8, 1974

[54] FUEL SUPPLY ARRANGEMENTS FOR GAS TURBINE ENGINES

[75] Inventor: Alan Arthur Crawley, Bromsgrove, England

[73] Assignee: Lucas Aerospace Limited, Birmingham, England

[22] Filed: Dec. 29, 1972

[21] Appl. No.: 319,645

[30] Foreign Application Priority Data
Jan. 29, 1972 Great Britain...................... 4,311/72

[52] U.S. Cl.............. 417/252, 60/39.28 R, 137/110
[51] Int. Cl.............................................. F04c 23/00
[58] Field of Search.................... 417/252; 60/39.28; 137/110

[56] References Cited
UNITED STATES PATENTS
3,147,712   9/1964   Gaubatz......................... 417/252 X
3,431,856   3/1969   Whitmore et al................ 417/252 X
2,709,339   5/1955   Edelman et al................. 417/252 X Primary Examiner—Robert G. Nilson
Assistant Examiner—Edward Look
Attorney—John C. Holman et al.

[57] ABSTRACT

A fuel supply arrangement for a gas turbine engine comprises a pair of centrifugal fuel pumps and a fuel control apparatus downstream of the pumps. A valve is responsive to the fuel pressure downstream of the control apparatus to connect said pumps in series or to cause the fuel flow to be provided by one of the pumps.

4 Claims, 1 Drawing Figure

PATENTED JAN 8 1974
3,784,329
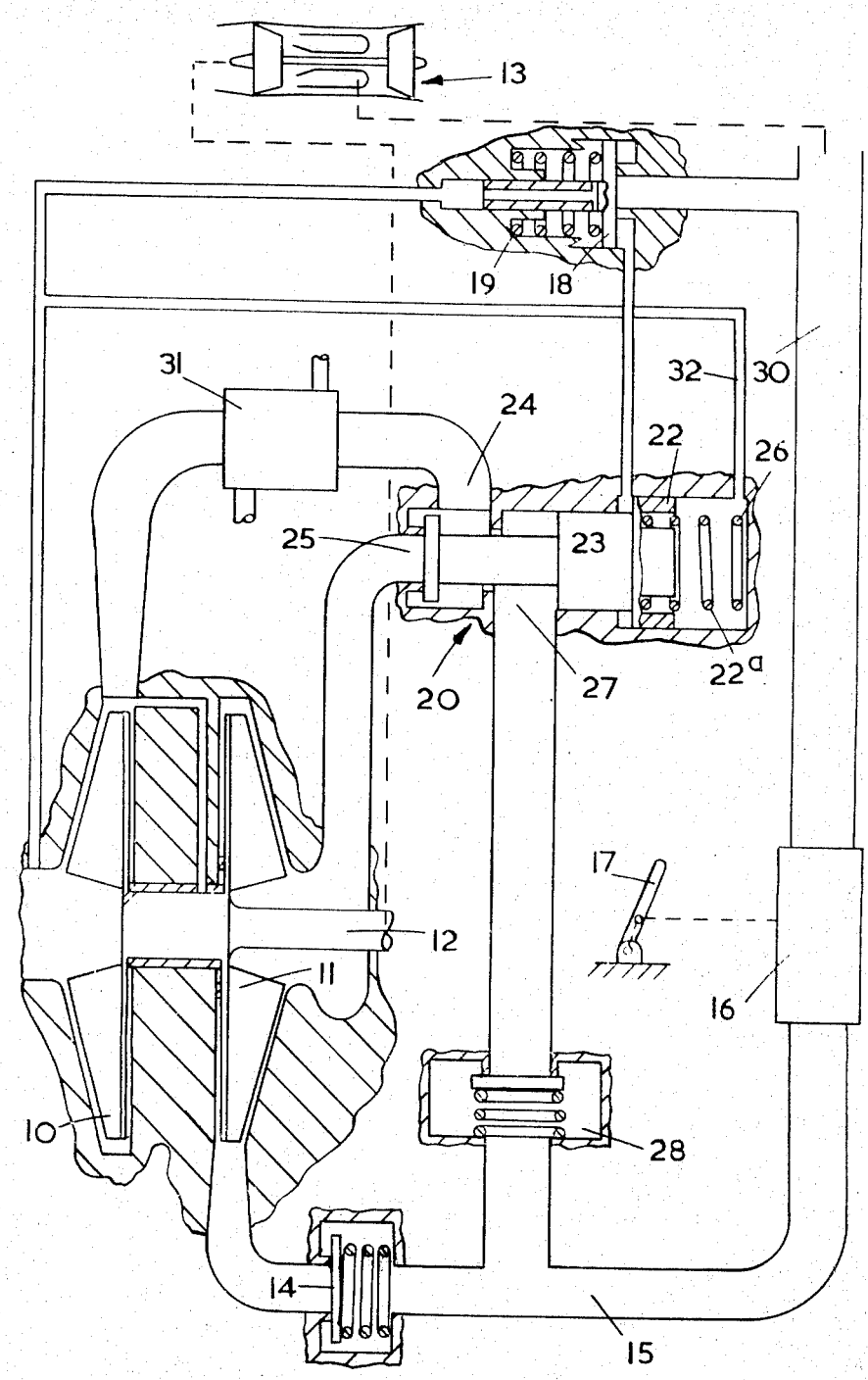

FUEL SUPPLY ARRANGEMENTS FOR GAS TURBINE ENGINES

This invention relates to a fuel supply arrangement for a gas turbine engine, and has as an object to provide such an arrangement in a convenient form.

According to the invention a fuel supply arrangement for a gas turbine engine comprises first and second centrifugal pumps each having an inlet and an outlet, the inlet of the first pump providing an inlet for the arrangement, a conduit for supplying fuel to the engine, fuel control apparatus in said conduit, and valve means responsive to the fuel pressure in said conduit downstream of said control arrangement and operable when said fuel pressure exceeds a predetermined value to establish a connection between the outlet of said first pump to the inlet of said second pump and connection between the outlet of said second pump to said conduit and, when the fuel pressure is less than said predetermined level to connect the outlet of said first pump to said conduit and shut off the connection between the inlet of second pump and the outlet of said first pump.

An example of the invention will now be described with reference to the accompanying drawings in which a fuel supply arrangement is shown diagrammatically.

Two centrifugal pumps 10, 11 are mounted on a single drive shaft 12, driven by a gas turbine engine 13. The inlet of pump 10 provides an inlet connection for the arrangement and the outlet of pump 11 is connected via a non-return valve 14 to a conduit 15. Conduit 15 communicates, via a fuel control arrangement 16, with the burners of engine 13. Control arrangement 16 is responsive, inter-alia, to the position of a throttle control 17 for the engine.

A pilot valve 18 is operable against a spring 19 when the fuel pressure in conduit 30 downstream of arrangement 16 exceeds a predetermined value to apply this fuel pressure as a control pressure signal to a pressure-operable valve 20. Valve 18 is in the form of a piston which is subjected on its respective sides to the pressures at the inlet of pump 10 and the pressure in conduit 30. In the shut position of valve 18 the effective area exposed to the pressure at the outlet of arrangement 16 is less than that when the valve is open. Valve 18 thus closes at a lower pressure in conduit 30 than that which is required to open valve 18. Valve 18 will not, therefore, oscillate in operation. Valve 20 has a control element 21 including a piston portion 22 slidable in a bore 22a responsive to the signal from valve 18 and a portion of smaller diameter than portion 22, responsive to a pressure downstream of pump 10.

The outlet of pump 10 is connected to a port 24 of valve 20 via an oil cooler arrangement 31 for the engine 13. The outlet of pump 11 is connected to a port 25 of valve 20. Control element 23 is biased by a spring 26 so as to shut off port 25 in the absence of a pressure signal from valve 18. A third port 27 on valve 20 communicates, via a non-return valve 28, with conduit 15 upstream of control arrangement 16.

In use, when the fuel flow is controlled by arrangement 16 so that the pressure of fuel supplied to the engine 13 is below that necessary to operate valve 18, the valve 20 is in the position shown. The inlet of pump 11 is shut and pump 10 delivers fuel via oil cooler 31, ports 24, 27 and non-return valve 28 to the control arrangement 16. Fuel is prevented from flowing back to pump 11 by non-return valve 14.

When the fuel supply pressure to the engine reaches a level at which valve 18 operates, this pressure is applied to piston portion 22 of valve 20 and assists the pressure at port 24 to move the control element 21 against spring 26 so as to interconnect ports 24, 25 and isolate port 27. Pumps 10, 11 are thereby connected in series, non-return valve 28 operating to prevent flow of fuel back to valve 20. In this way the full range of pressures required can be obtained from a simple pump/valve arrangement in an economical manner.

Restrictor 32 acts to damp movement of valve 20, and thereby to prevent high pressure surges during operation of the arrangement.

I claim:

1. A fuel supply arrangement for a gas turbine engine comprising first and second centrifugal pumps each having an inlet and an outlet, the inlet of the first pump providing an inlet for the arrangement, a conduit for supplying fuel to the engine, means for connecting the outlet of said second pump to said conduit, fuel control apparatus in said conduit, and valve means responsive to the fuel pressure in said conduit downstream of said control apparatus and operable when said fuel pressure exceeds a predetermined value to establish a connection between the outlet of said first pump to the inlet of said second pump and, when fuel pressure is less than said predetermined level to connect the outlet of said first pump to said conduit and shut off the connection between the inlet of said second pump and the outlet of said first pump.

2. A fuel supply arrangement as claimed in claim 1 in which said valve means comprises a pressure operable valve controlling the connection of the first pump outlet to said conduit and to the second pump inlet and a pilot valve sensitive to the fuel pressure in said conduit downstream of said fuel control apparatus and arranged to provide a pressure signal for operating said pressure operable valve when said fuel pressure exceeds said predetermined valve.

3. A fuel supply arrangement as claimed in claim 2 in which said pressure operated valve includes a piston portion slidable in a bore and a flow restrictor is provided for restricting flow into and out of said bore so as to damp movement of the pressure operated valve.

4. A fuel supply arrangement as claimed in claim 2 in which said valve means further comprises a pair of non-return valves connecting the outlet of the second pump and said pressure operated valve respectively to the conduit and preventing flow therethrough from the conduit.

* * * * *